Patented May 13, 1941

2,241,796

UNITED STATES PATENT OFFICE 2,241,796

AZO DYESTUFFS

Carl Taube, Leverkusen-I. G.-Werk, Heinrich Rinke, Leverkusen - Schlebusch, and Erich Fischer, Bad Soden, in Taunus, Germany, assignors to General Aniline & Film Corporation, a corporation of Delaware No Drawing. Application May 27, 1939, Serial No. 276,228. In Germany May 30, 1938

6 Claims. (Cl. 260—161)

The present invention relates to new azo dyestuffs, more particularly it relates to azo dyestuffs of the general formula $$R-N=N-C-C-CH_3$$
$$H_2N-C\ \ \ \ N$$
$$\diagdown N \diagup$$
$$|$$
$$aryl$$

wherein R—N=N— stands for the radical of a diazo compound bearing in ortho-position to the —N=N—bridge a group capable of forming metal complex compounds; it further relates to a method of preparing these dyestuffs, their metal complex compounds in substance as well as on the fiber, to a process of dyeing and to dyed fibers.

The new dyestuffs are obtainable by coupling diazo compounds of aromatic amines containing in ortho-position to the diazotizable amino group a group capable of forming metal complex compounds with 1-aryl-3-methyl-5-aminopyrazoles. In case of diamines e. g. of diamino-diphenyls, diaminodiphenyl ureas and similar compounds containing the mentioned metal complex forming groups, these amines are tetrazotized and correspondingly now coupled with two molecular proportions of 1-aryl-3-methyl-5-aminopyrazoles which in this case may be identical or different.

Amines of the above mentioned kind are, for instance, those containing in ortho-position to the amino group a —COOH—, —OCH₂.COOH—,
—OCH₂.CH₂.COOH—, —OCH₃—, —OH— or

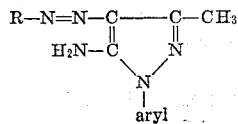

group. The aryl radical of the 1-aryl-3-methyl-5-amino-pyrazoles can be e. g. a phenyl radical or naphthyl radical which themselves may be further substituted; as substituents may be mentioned the sulfonic acid group, the carboxylic acid group, alkyl, halogen or alkoxy. The new dyestuffs are yellow powders which dissolve in water with yellow to orange coloration; they dye cotton, wool and regenerated cellulose yellow to orange shades which, when aftertreated with agents yielding metal, change to red to brown-red shades. The aftertreatment of the new dyestuffs can also take place in substance. Of the agents yielding metal may be mentioned the copper, chromium, nickel, iron or cobalt salts of which several may be applied simultaneously.

The following examples illustrate our invention without, however, restricting it thereto, the parts being by weight.

Example 1

22.8 parts of 4.4'-diaminodiphenyl-3.3'-dicarboxylic acid are tetrazotized with 13.8 parts of sodium nitrite in the usual way and the filtered tetrazo solution is slowly added to a sodium carbonate alkaline suspension of 35 parts of 1-phenyl-3-methyl-5-aminopyrazole (prepared by dissolving the pyrazole in alcohol and pouring the solution into water). After several hours the yellow dyestuff is separated by adding salt, filtered and dried. It corresponds in its free state to the following formula

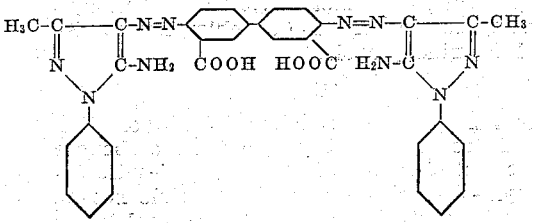

and dyes cotton from the Glauber's salt bath yellow shades which change, when aftertreated with copper salts to yellow-brown shades.

Example 2

18,2 parts of 2-amino-5-nitrobenzoic acid are diazotized in the usual way with 6,9 parts of sodium nitrite and coupled with 17.3 parts of 1-phenyl-3-methyl-5-aminopyrazole in a medium alkaline with sodium carbonate. The yellow monoazodyestuff is isolated and reduced in aqueous solution with 35 parts of crystallized sodium sulfide at 70–80° C. The aminoazodyestuff thus obtained, which may be purified if desired, is treated with phosgene in aqueous solution alkaline with sodium carbonate at 20–30° C. until the amino group can no longer be detected by diazotizing and coupling. The formed dyestuff is isolated and dried. It corresponds in its free state to the following formula

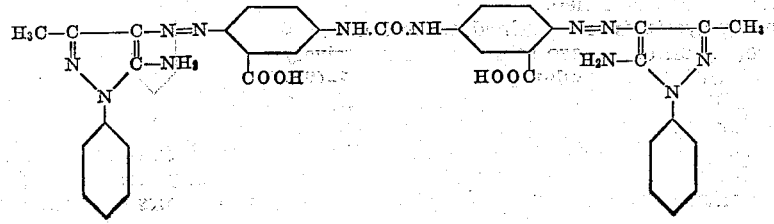

and dyes cotton from the Glauber's salt bath when aftertreated with copper sulfate yellow-brown shades.

Example 3

To a solution of 71.5 parts of potassium-4,4'-diamino-3,3'-diphenoxyacetate in 3000 parts of water, 20 parts of sodiumnitrite and thereupon hydrochloric acid are added until the liquor shows mineral acid reaction. Into the tetrazo solution rendered weakly alkaline with sodiumbicarbonate the alcoholic solution of 55 parts of 1-phenyl-3-methyl-5-aminopyrazole is run. After several hours' stirring the formed dyestuff is filtered off and dried. It corresponds in its free state to the following formula

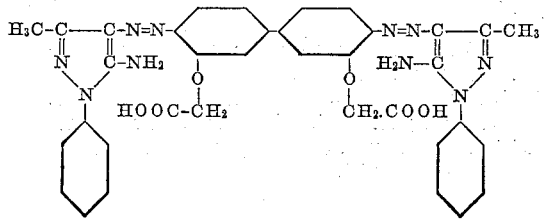

and dyes cotton or regenerated cellulose from the Glauber's salt bath orange-yellow shades. By aftertreatment with copper salts clear yellowish-red shades are obtained. By a corresponding aftertreatment with nickel salts bluish-red shades, with cobalt salts somewhat duller red shades, with iron salts brown shades are obtained.

A dyestuff of similar properties is obtained, if the 1-phenyl-3-methyl-5-aminopyrazole is replaced by 1-(2'-methoxyphenyl)-3-methyl-5-aminopyrazole, 1-(4'-methoxyphenyl)-3-methyl-5-aminopyrazole or 1-(2'-chlorphenyl)-3-methyl-5-aminopyrazole.

Example 4

Into a bicarbonate alkaline tetrazo solution obtained according to Example 3 a bicarbonate alkaline solution of 94 parts 1-(6'-sulfo-2'-naphthyl)-3-methyl-5-aminopyrazole is run. The coupling is completed within several hours at room temperature. The dyestuff is salted out, filtered off and dried. It corresponds in its free state to the following formula

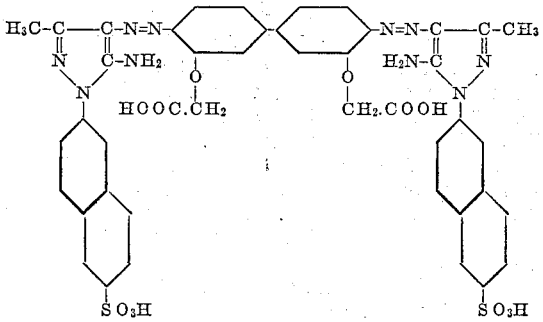

and dyes cotton or regenerated cellulose from the Glauber's salt bath orange-yellow shades. By aftertreatment with copper salts clear bluish-red shades are obtained.

Similar dyestuffs are obtained, when 1 molecular proportion of tetrazo solution is successively coupled with 1 molecular proportion of 1-(2'-naphthyl)-3-methyl-5-aminopyrazole and 1 molecular proportion of 1-(6'-sulfo-2'-naphthyl)-3-methyl-5-aminopyrazole or with 1 molecular proportion of 1-phenyl-3-methyl-5-aminopyrazole and 1 molecular proportion of 1-(6'-sulfo-2'-naphthyl)-3-methyl-5-aminopyrazole or with 1 molecular proportion of 1-(2'-naphthyl)-3-methyl-5-aminopyrazole and 1 molecular proportion of 1-(4'-sulfophenyl)-3-methyl-5-aminopyrazole.

Example 5

21.7 parts of 2-amino-5-sulfobenzoic acid are diazotized in mineral acid solution with 6.9 parts of sodium nitrite in the usual way and coupled in bicarbonate alkaline solution with 17.3 parts of 1-phenyl-3-methyl-5-aminopyrazole. The isolated and dried dyestuff which corresponds in its free state to the following formula

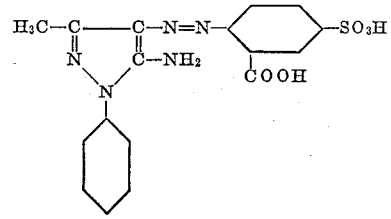

dyes wool from an acid bath, when aftertreated with chromium salts orange-brown shades.

Example 6

10.6 parts of 2-amino-5-nitrophenol-4-sulfonic acid are diazotized in the usual way and thereto a weakly acid solution of 6.9 parts of 1-phenyl-3-methyl-5-aminopyrazole is added. The mineral acid is neutralized with sodium acetate, whereupon the coupling slowly sets in and is finished after several hours. The dyestuff which corresponds in its free state to the following formula

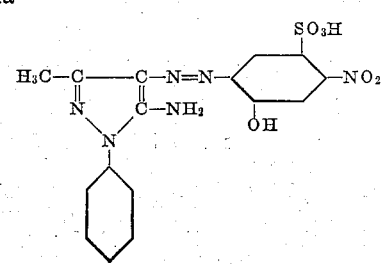

dyes wool from an acid bath when aftertreated with chromium salts reddish-bordeaux shades.

A similar dyestuff is obtained if instead of 2-amino-5-nitrophenol-4-sulfonic acid the 2-amino-4-nitrophenol-6-sulfonic acid is used.

Example 7

A tetrazo solution prepared in the usual way from 17.6 parts of dianisidine is added in small amounts to a bicarbonate alkaline solution of 18 parts of 1-(4'-sulfophenyl)-3-methyl-5-aminopyrazole. The formed dyestuff is salted out, filtered off and dried. It corresponds in its free state to the following formula

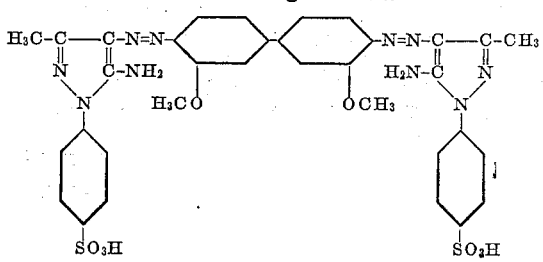

and dyes cotton from the Glauber's salt bath orange-red shades; when aftertreated with copper salts red shades are formed.

Example 8

If 4 parts of the dyestuff obtained according to Example 7 are heated in an autoclave with addition of 2 parts of copper sulfate and 2 parts of sodium acetate in 100 parts of water for several hours to 180° C., a complex copper compound is obtained which is insoluble in acid. This compound is treated in sodium hydroxide alkaline solution with 2,4 parts of sodium sulfide while warming, the formed copper sulfide is removed by filtering and in the filtrate the dyestuff is precipitated with acids. The product thus obtained dissolves in sodium carbonate solution with a yellow-brown coloration and dyes cotton from the Glauber's salt bath orange shades. By aftertreatment with copper salts the shade changes to red.

Example 9

2.8 parts of 1-phenyl-3-methyl-5-aminopyrazole are coupled in weakly sodium hydroxide alkaline solution with the diazo solution prepared in the usual way from 3.6 parts of 4-nitro-2-aminophenol-6-sulfonic acid. The dyestuff, which corresponds in its free state to the following formula

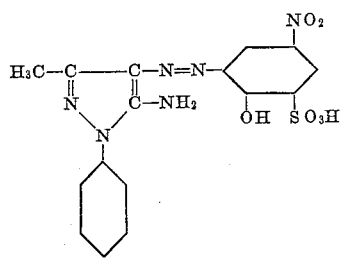

is isolated by adding salt, filtered off and heated together with a solution of 9.2 parts of chromium oxide in 11 parts of formic acid and 100 parts of water in an autoclave for 3 hours to 125–130° C. When cooling the dark red complex chromium dyestuff crystallizes and is filtered off. The dyestuff dyes wool from a bath acidified with sulfuric acid red shades.

Example 10

17.6 parts of dianisidine are tetrazotized in the usual way and coupled with 28 parts of 1-(3'-carboxy-phenyl)-3-methyl-5-aminopyrazole in bicarbonate alkaline solution with the addition of pyridine. After several hours the dyestuff is isolated by adding dilute hydrochloric acid, filtered and dried. The dyestuff, which corresponds in its free state to the following formula

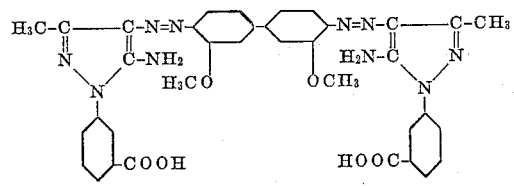

dyes cotton from the Glauber's salt bath orange-yellow shades. By aftertreatment with copper salts red shades are obtained.

We claim:

1. As new products azo dyestuffs of the general formula

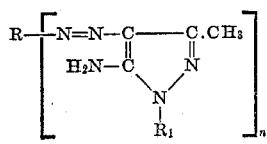

wherein R stands for an aromatic radical bearing in ortho-position to the —N=N—bridge a group capable of forming metal complex compounds, $R_1$ stands for a radical selected from the group consisting of the benzene and naphthalene series and $n$ stands stands for one of the numbers 1 and 2, being convertible into metal complex compounds in substance or on the fiber by a treatment with agents yielding metal.

2. As new products azo dyestuffs of the general formula

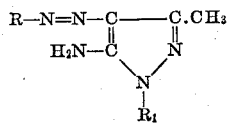

wherein R—N=N— stands for the radical of a monodiazo compound bearing in ortho-position to the —N=N—bridge a group capable of forming metal complex compounds, and $R_1$ stands for a radical selected from the group consisting of the benzene and naphthalene series being convertible into metal complex compounds in substance or on the fiber by a treatment with agents yielding metal.

3. As new products azo dyestuffs of the general formula

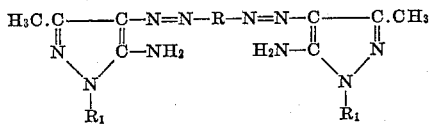

wherein —N=N—R—N=N— stands for the radical of a tetrazo compound bearing in ortho-position to each —N=N—bridge a group capable of forming metal complex compounds, and $R_1$ stands for a radical selected from the group consisting of the benzene and naphthalene series being convertible into metal complex compounds in substance or on the fiber by a treatment with agents yielding metal.

4. As new products azo dyestuffs of the general formula

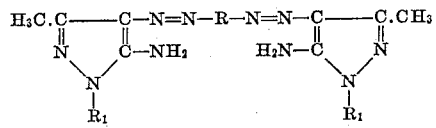

wherein —N=N—R—N=N— stands for the radical of a tetrazodiphenyl compound bearing in ortho-position to each —N=N—bridge a group capable of forming metal complex compounds, and $R_1$ stands for a radical selected from the group consisting of the benzene and naphthalene series being convertible into metal complex compounds in substance or on the fiber by a treatment with agents yielding metal.

5. As a new product the azo dyestuff corresponding in its free state to the following formula

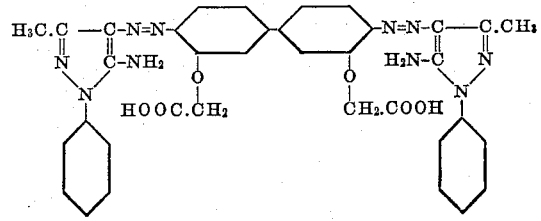

dyeing cotton or regenerated cellulose orange-yellow shades, which change by aftertreatment with copper salts to clear yellowish-red shades.

6. As a new product the azo dyestuff corresponding in its free state to the following formula
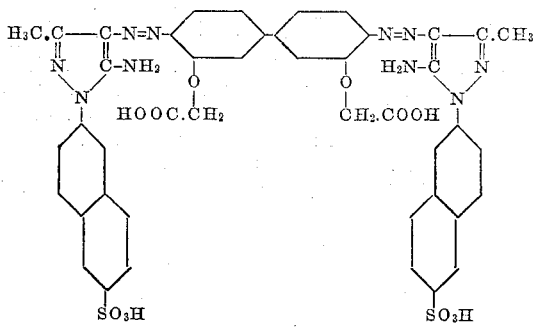
dyeing cotton or regenerated cellulose orange-yellow shades which change by aftertreatment with copper salts to clear bluish-red shades.
CARL TAUBE.
HEINRICH RINKE.
ERICH FISCHER.